(12) United States Patent
Natarajan et al.

(10) Patent No.: US 10,289,969 B2
(45) Date of Patent: May 14, 2019

(54) SOLUTION MANAGEMENT BASED ON A SOCIAL NETWORK OF DEVICES AND ADMINISTRATORS

(71) Applicant: Dell Products L.P., Round Rock, TX (US)

(72) Inventors: Avinash Natarajan, Chennai (IN); Shathish Muthu Venkatesan, Pulavar Nagar Vellore (IN); Sanal Kumar Sivaraman, Chennai (IN); Vinoth Kumar Arumugam, Chengalpet (IN); Rajasekhar Pulluru, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 226 days.

(21) Appl. No.: 14/830,018

(22) Filed: Aug. 19, 2015

(65) Prior Publication Data

US 2017/0054588 A1    Feb. 23, 2017

(51) Int. Cl.
| | |
|---|---|
| *G06Q 10/06* | (2012.01) |
| *G06Q 10/00* | (2012.01) |
| *G06Q 50/00* | (2012.01) |
| *H04L 12/24* | (2006.01) |

(52) U.S. Cl.
CPC ....... *G06Q 10/06311* (2013.01); *G06Q 10/20* (2013.01); *G06Q 50/01* (2013.01); *H04L 41/0213* (2013.01); *H04L 41/0686* (2013.01)

(58) Field of Classification Search
CPC .. H04L 41/0253; H04L 41/0686; H04L 67/10
USPC ....................................................... 709/223
See application file for complete search history.

(56) References Cited

U.S. PATENT DOCUMENTS

| | | | | |
|---|---|---|---|---|
| 2002/0120772 A1* | 8/2002 | Yada | ....................... | H04L 29/06 709/238 |
| 2012/0030282 A1* | 2/2012 | Brody | ..................... | G06Q 50/01 709/203 |
| 2013/0091149 A1* | 4/2013 | Dunn | ...................... | G06Q 10/10 707/749 |
| 2013/0174275 A1* | 7/2013 | Micucci | .............. | H04L 67/1044 726/28 |
| 2013/0185426 A1* | 7/2013 | Chevillat | ............... | G06Q 10/10 709/225 |
| 2014/0086099 A1* | 3/2014 | Li | .......................... | H04L 69/324 370/254 |
| 2015/0281393 A1* | 10/2015 | Sng | ......................... | H04L 67/22 709/204 |

* cited by examiner

*Primary Examiner* — Vivek Srivastava
*Assistant Examiner* — Atta Khan
(74) *Attorney, Agent, or Firm* — Terrile, Cannatti & Chambers; Stephen A. Terrile

(57) ABSTRACT

A system, method, and computer-readable medium are disclosed for managing an IT environment via a social network management operation. In various embodiments, the social network management operation enables an IT administrator to manage an IT environment using a social network analog. With the social network analog, IT administrators identify devices within the IT environment as friends. Additionally, in certain embodiments, events that occur in the devices which have been identified as friends by the IT administrators can be associated with an interest list. Additionally, in certain embodiments, the IT environment includes a plurality of spans of control, each of which is administered by different IT administrators.

17 Claims, 2 Drawing Sheets

SOLUTION MANAGEMENT BASED ON A SOCIAL NETWORK OF DEVICES AND ADMINISTRATORS

BACKGROUND OF THE INVENTION

Field of the Invention

The present invention relates to information handling systems. More specifically, embodiments of the invention relate to solution management based upon a social network of devices and administrators.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to combine a plurality of information handling system into a managed information technology (IT) environment. With such an IT environment it becomes important to provide IT administrators with an ability to manage the IT environment. Management of the IT environment can include monitoring of the devices within the IT environment as well as administration of some or all of the devices within the IT environment. Known network management system (NMS) applications often provide an abundance of data for the IT administrator. However, the data is often provided on a system basis which can cause challenges when an issue within the IT environment spans boundaries between network type information handling systems, storage type information handling systems and server type information handling systems within the IT environment.

SUMMARY OF THE INVENTION

A system, method, and computer-readable medium are disclosed for managing an IT environment via a social network management operation. In various embodiments, the social network management operation enables an IT administrator to manage an IT environment using a social network analog. With the social network analog, IT administrators identify devices within the IT environment as friends. Additionally, in certain embodiments, for specific devices that are identified as friends, the IT administrators can associate an interest list. Additionally, in certain embodiments, the IT environment includes a plurality of spans of control, each of which is administered by different IT administrators.

Additionally, in certain embodiments, the IT administrator using the social network management operation to identify other IT administrators with whom the IT administrator desires to collaborate by adding the other IT administrators to their network of friends. Additionally, with the social network analog, IT administrators identify devices within the IT environment as friends. In certain embodiments, the social network management operation causes events to appear on a news feed of the social network analog whenever an event occurs which affects a device which is in the administrator's friend list. Additionally, in certain embodiments, the social network management operation causes events to appear on a timeline of the social network analog only when that event is present in the administrator's interest list and occurs on a device that is present in the administrator's friend list. More specifically, in certain embodiments, the interest list can depend on an area of specialization of the IT administrator (e.g., quality of service (Qos), routing, etc.).

Additionally, in certain embodiments, the social network management operation causes events to appear via a short message indicative of the event (such as a hashtag type of short message) of the social network analog whenever an event occurs which affects a device which is present in the administrator's friend list.

In various embodiments, the social network analog notification provides a link to a device page for the device causing the event. The device page includes important statistics and/or events associated with the device to facilitate analysis of the event. Additionally, the IT administrator is also able to directly access the device via the device page (e.g., be able to log in to the device) to allow the IT administrator to interact with the device such as making configuration changes to the device to address the event. Admins would also have the ability to share the event with Other Users/Admins or comment on it.

Additionally, in various embodiments, the social network management operation is accessible via mobile devices and portable information handling systems like any mainstream social network.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
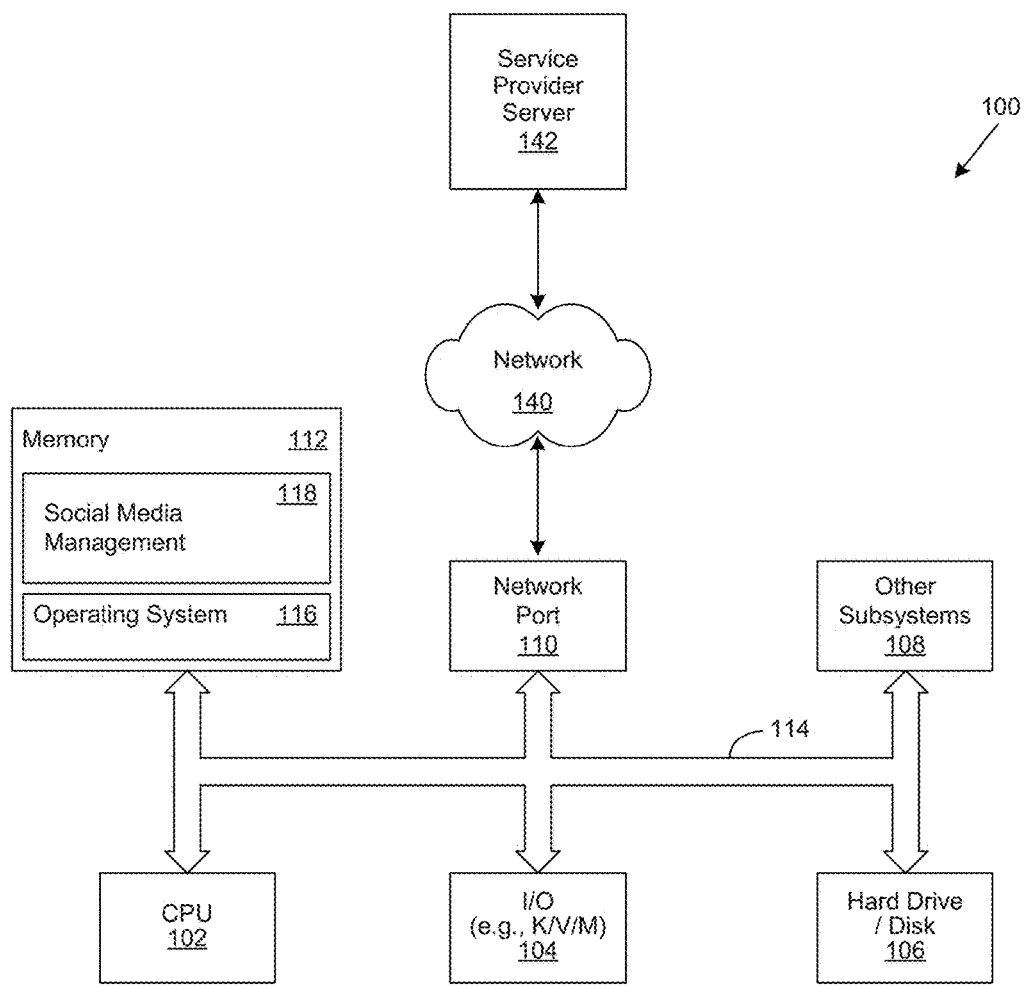
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise social media management module 118.

The social media management module 118 enables an IT manager to manage an IT environment via a social network management operation. In various embodiments, the social network management operation enables an IT administrator to manage an IT environment using a social network analog. With the social network analog, IT administrators identify devices within the IT environment as friends. Additionally, in certain embodiments, for devices which have been identified as friends, the IT administrators can associate an interest list with the device. The interest list represents either domains or spans of control that the IT administrator manages such as QoS, Routing, etc. Additionally, in certain embodiments, the IT environment includes a plurality of spans of control, each of which is administered by different IT administrators.

Additionally, in certain embodiments, the IT administrator uses the social network management operation to identify other IT administrators with whom the IT administrator desires to collaborate by adding the other IT administrators to their network of friends. Additionally, with the social network analog, IT administrators identify devices within the IT environment as friends. In certain embodiments, the social network management operation causes events to appear on a news feed of the social network analog whenever an event occurs which affects a device which is in the administrator's friend list. Additionally, in certain embodiments, the social network management operation causes events to appear on a timeline of the social network analog only when that event is present in the administrator's interest list and occurs on a device that is present in the administrator's friend list. More specifically, in certain embodiments, the interest list can depend on an area of specialization of the IT administrator (e.g., quality of service (Qos), routing, etc.).

Additionally, in certain embodiments, the social network management operation causes events to appear via a short message indicative of the event (such as a hashtag type of short message) of the social network analog whenever an event occurs which affects a device which is present in the administrator's friend list.

Figure 2:
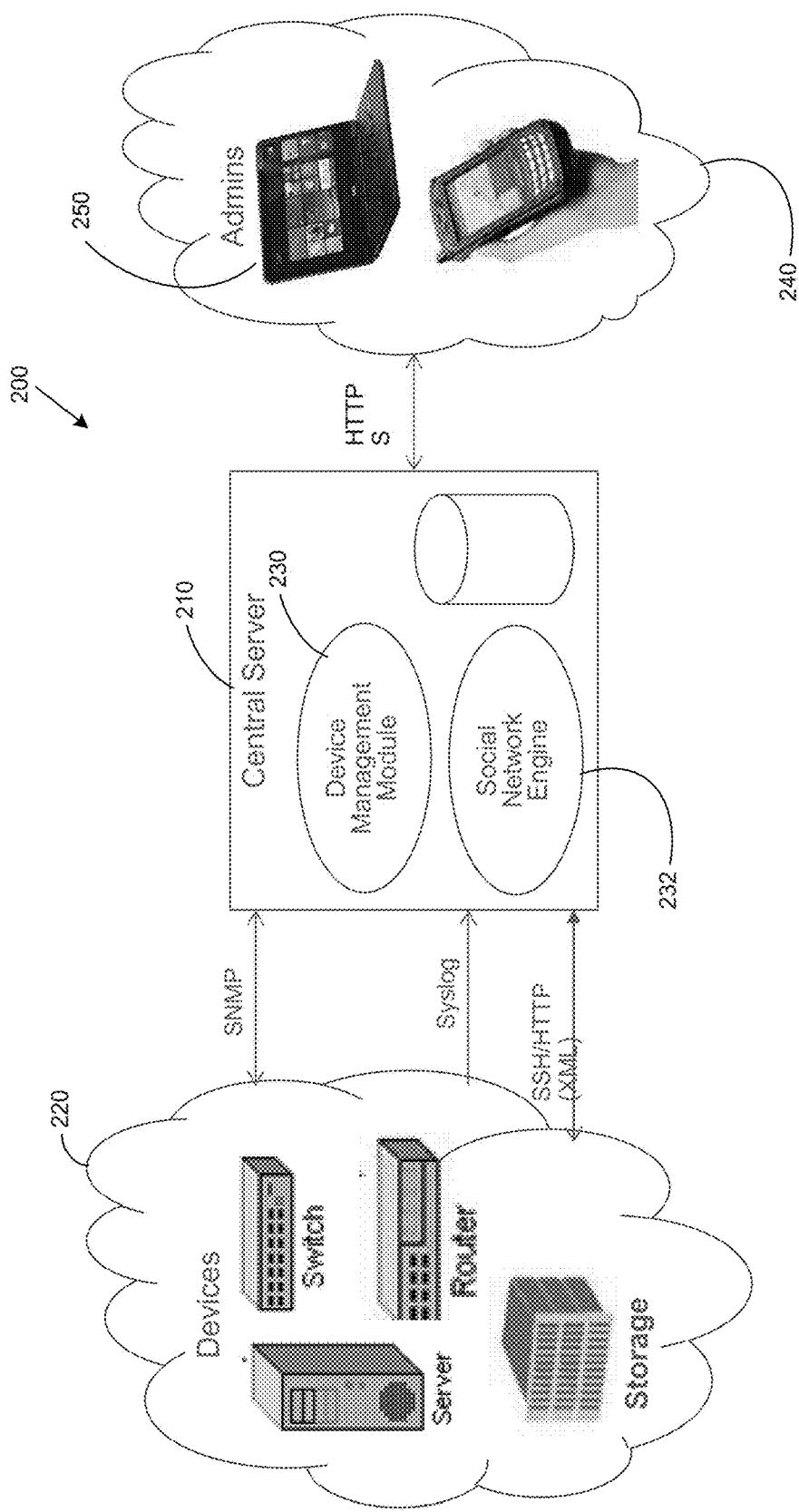
FIG. 2 shows a block diagram of an IT environment.

Referring to FIG. 2, a block diagram of an IT environment 200 is shown. More specifically, the IT environment 200 includes an IT environment management system 210, which in certain embodiments may comprise a central server, as well as a plurality of devices 220. As will be appreciated by those of skill in the art, the plurality of devices within the IT environment can includes some or all of desktop type information handling systems, server type information handling systems, storage devices, switches, routers, etc. In various embodiments, devices 220 communicate with the IT environment management system 210 via simple network management protocol (SNMP) type communication, a message logging standard such as the Syslog standard, and/or a secure shell/hypertext transfer protocol (SSH/HTTP) type communication.

The IT environment management system 210 includes a device management module 230 as well as a social network management tool 232. The social network management tool 232 includes some or all of the functions of the social network management module 118. IT administrators 240 interact with the IT environment management system 210 to manage various devices 220 of the IT environment 200. In certain embodiments, the IT administrators 240 communicate with the IT environment management system 210 via a secure communication link such as a HTTP Secure (HTTPS) type communication link. In various embodiments, the IT administrators 240 manage the IT environment 200 using a social media analog presented on portable or mobile information handling systems 250.

As used herein, a mobile information handling system refers to wireless devices such as mobile telephones, smart phones, personal digital assistants (PDAs), tablet computers, handheld or laptop computers, and similar devices that have telecommunications capabilities. In various embodiments, the mobile information handling system is used to exchange information between an IT administrator and the IT environment management system 210, described in greater detail herein through the use of a network 140.

In various embodiments, the network 140 may be a public network, such as the Internet, a physical private network, a virtual private network (VPN), a wireless network, or any combination thereof. In certain embodiments, the wireless network may be a personal area network (PAN), based on technologies such as Bluetooth or Ultra Wideband (UWB). In various embodiments, the wireless network may include a wireless local area network (WLAN), based on variations of the IEEE 802.11 specification, often referred to as WiFi. In certain embodiments, the wireless network may include a wireless wide area network (WWAN) based on an industry standard including two and a half generation (2.5G) wireless technologies such as global system for mobile communications (GPRS) and enhanced data rates for GSM evolution (EDGE). In various embodiments, the wireless network may include WWANs based on existing third generation (3G) wireless technologies including universal mobile telecommunications system (UMTS) and wideband code division multiple access (W-CDMA).

Other embodiments may include the implementation of other 3G technologies, including evolution-data optimized (EVDO), IEEE 802.16 (WiMAX), wireless broadband (Wi-Bro), high-speed downlink packet access (HSDPA), high-speed uplink packet access (HSUPA), and emerging fourth generation (4G) wireless technologies. Skilled practitioners of the art will realize that many such embodiments are possible and the foregoing is not intended to limit the spirit, scope or intent of the invention.

In operation, the devices 220 provide updates to the IT environment management system 210 using the standard communication protocols such as mechanisms such as SNMP, and Syslog. The IT environment management system 210 interacts with all devices 220 within the IT environment 200 regardless of manufacturer using existing device software. In certain embodiments, a proprietary application such as a user datagram protocol (UDP) type application end point is used for information exchange between devices 220 and the IT environment management system 210 to exchange data that doesn't fall under the umbrella generic mechanisms. Additionally, in certain embodiments, the devices 220 send responses using a representational state transfer (REST) protocol for specific requests from the IT environment management system 210. Additionally, in certain embodiments, the devices 210 send about itself and neighbors of the device (e.g., based on link layer discovery protocol (LLDP) information) to the IT environment management system 210 to allow the IT environment management system 210 to build a map of devices of interest.

Additionally, in certain embodiments, the IT environment management system 210 resides on a centralized server and is responsible for accepting data from the various devices 210. In certain embodiments, the IT environment management system includes a polling mechanism to periodically poll all devices (e.g., by using SNMP Get operations), so as to be updated regarding operational information of the devices 210. In certain embodiments, data and/or event information is received from the devices 210 and is stored in a database 260 of the centralized server. This information is then available for use by the device management module 230 and the social network engine 232. In certain embodiments, all events that the framework supports are pushed from the devices 210 to the IT environment management system 210.

The IT environment management system 210 generates events that are provided to an end point application of the Administrators based on a plurality of factors. More specifically, in various embodiments, the factors include whether the device is in the friend list of the administrator, whether the event is in an interest list of the administrator, the severity of the event, if an event has actuated (e.g., has been commented on and/or liked) by someone that is in the friends list of the administrator, events that are explicitly shared by administrators that are on friends list of the administrator. Additionally, in various embodiments, the events generated by the IT environment management system 210 are provided to the end point application of the administrator in reverse chronological to facilitate correlation in case of an outage.

The events received at the end point application pop up as event notifications, and are displayed on a timeline within the end point application. An administrator can actuate the event or the device context to obtain additional information on the event or can directly access a page within social media analog for the device. In various embodiments, the device page contains an activity log, which includes a representation of a set of events for the device as a news feed. In various embodiments, the device page also includes an 'About' link to allow a user to efficiently access a page containing important information about the device (e.g., the management IP address for the device, the route processor module (RPM) and/or line cards information for the device). In various embodiments, the device page also provides handles for triggering representational state transfer (Rest) application program interfaces (APIs) apart from command line interface (CLI) access (e.g., to facilitate configuration, or to enable a Smartscripts invocation).

In various embodiments, the event received at the end point application contains a plurality of event information. For example, the event information contains some or all of an event time, a description of the event, a device line for the device generating the event. Also, in certain embodiments, the event presentation on the end point application includes a "View Similar" events representation such as a "View Similar" button representation. The "View Similar" events representation allows a user to easily obtain insight to similar events in the past, and their remedies, if any. In certain embodiments, proactive fault events (e.g., traps) are also considered as events and are displayed by the end point application. The administrator also has an ability to group events (e.g., by grouping certain events into a Tab) to avoid clutter and to segregate various devices. Additionally, the end point application provides the administrator with access to a network map of the devices on the friend list of the administrator. In certain embodiments this network map is generated using a link layer discovery protocol (LLDP).

Upon the occurrence of an event, an administrator can access the device directly from the device page within the end point application to allow the administrator to react to the event (e.g., by adjusting the configuration of the device generating the event). Also, the IT environment management system 210 maintains a history of configuration remedies for events. When the event recurs, a suggestion with the previous configuration remedy is presented to the user to aid solving the issue relating to the event. The device page also includes support device management features such as "Power ON/OFF," setting management port IP etc. Continuing with the social network analog, the end point application provides an administrator with an ability to tag an administrator or device within a comment to provide a reaction to an event feed, or to share the event in an administrator's page or a device's page. Additionally, in certain embodiments, events are reported in time lines with tags that qualify events with specific key words such as hash tags. Such a tagging facilitates usage of third party applications for hash tag based data mining.

In certain embodiments, the IT environment management system 210 periodically archives events to more efficiently manage disc usage and processing. Also, in certain embodiments, the IT environment management system 210 includes an ability to designate a super user. The super user has administrative control over the IT environment management system 210 including for example assigning which devices can be befriended by a particular administrator. For example, the super user can define a security policy which can prevent certain network administrators from adjusting configuration a server. In various embodiments, all administrators would be allowed to add any device to their particular Friends list with 'Read' access to the device (i.e., the administrator would not have access to configuration from the Device page of the Device). Additionally, in various embodiments, the IT environment management system 210 includes a control on which administrators can add specific devices to their Friends list to include 'Write' access. Additionally, in certain embodiments, adding a device with 'Write' access would require the user to have the appropriate authorization (e.g., form the super user) before adding the device to include 'Write' access.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for managing an information technology (IT) environment, comprising:
   identifying a plurality of devices within the IT environment;
   communicating between the plurality of devices and an IT environment management system, at least one of the plurality of devices communicating with the IT environment management system via a standard communication protocol, the standard communication protocol comprising at least one of a simple network management protocol (SNMP) communication protocol and a Syslog communication protocol, another of the plurality of devices communicating with the IT environment management system via a user datagram protocol type application;
   providing event information from a device of the plurality of devices to the IT environment management system, the IT environment management system comprising a server type information handling system, the IT environment management system performing a social network management operation, the social network management operation providing event information to an IT environment administrator via a social network analog;
   managing the device of the plurality of devices via the social network engine, the social network engine providing the social network analog; and,
   identifying certain devices of the plurality of devices within the IT environment as friends in the social media analog; and wherein
   at least some of the plurality of devices provide information about themselves and neighbors to allow the IT environment management system to build a map of devices of interest, the information about neighbors being based on link layer discovery protocol (LLDP) information;
   the IT environment management system generates events,
   the events are provided to an end point application of the IT environment administrator based upon a plurality of factors; and,
   the plurality of factors comprise whether the device is in a friend list of the end point application of the IT environment administrator, the friend list representing devices with which the user interacts, events from devices in the friend list being presented within a news feed of the social network analog, whether the event is in an interest list of the end point application of the IT environment administrator, the interest list representing an area of specialization of the IT environment administrator, a severity of the event, if the event has actuated by someone that is in the friends list of the end point application of the IT environment administrator, and when a event is explicitly shared by administrators that are on the friends list of the end point application of the IT environment administrator.

2. The method of claim 1, further comprising:
associating certain devices from the plurality of devices with an interest list of the IT environment administrator.

3. The method of claim 2, wherein:
the social network management operation causes events to appear on a news feed of the social network analog whenever an event occurs which affects a device which is associated with the interest list of the IT environment administrator.

4. The method of claim 2, wherein:
the social network management operation causes events to appear on a timeline of the social network analog whenever an event occurs which affects a device which is present in the administrator's friend list, and the event is present in the administrator's interest list for that device.

5. The method of claim 1, wherein:
the social network management operation allows the IT environment management administrator to identify other IT administrators by adding the other IT administrators to a network of friends of the IT administrator, the network of friends facilitating collaboration among a plurality of IT administrators.

6. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
identifying a plurality of devices within the IT environment;
communicating between the plurality of devices and an IT environment management system, at least one of the plurality of devices communicating with the IT environment management system via a standard communication protocol, the standard communication protocol comprising at least one of a simple network management protocol (SNMP) communication protocol and a Syslog communication protocol, another of the plurality of devices communicating with the IT environment management system via a user datagram protocol type application;
providing event information from a device of the plurality of devices to an IT environment management system, the IT environment management system comprising a social network engine, the IT environment management system executing on a server type information handling system, the IT environment management system performing a social network management operation, the social network management operation providing the event information to an IT environment administrator via a social network analog;
managing the device of the plurality of devices via the social network engine, the social network engine providing the social network analog; and,
identifying certain devices of the plurality of devices within the IT environment as friends in the social media analog; and wherein
at least some of the plurality of devices provide information about themselves and neighbors to allow the IT environment management system to build a map of devices of interest, the information about neighbors being based on link layer discovery protocol (LLDP) information;
the IT environment management system generates events,
the events are provided to an end point application of the IT environment administrator based upon a plurality of factors; and,
the plurality of factors comprise whether the device is in a friend list of the end point application of the IT environment administrator, the friend list representing devices with which the user interacts, events from devices in the friend list being presented within a news feed of the social network analog, whether the event is in an interest list of the end point application of the IT environment administrator, the interest list representing an area of specialization of the IT environment administrator, a severity of the event, if the event has actuated by someone that is in the friends list of the end point application of the IT environment administrator, and when a event is explicitly shared by administrators that are on the friends list of the end point application of the IT environment administrator.

7. The system of claim 6, wherein the instructions are further configured for:
associating certain devices of the plurality of devices within the IT environment with an interest list of the IT environment administrator.

8. The system of claim 7, wherein:
the social network management operation causes events to appear on a news feed of the social network analog whenever an event occurs which affects a device which is associated with the interest list of the IT environment administrator.

9. The system of claim 7, wherein:
the social network management operation causes events to appear on a timeline of the social network analog whenever an event occurs which affects a device which is associated with the interest list.

10. The system of claim 6, wherein:
the social network management operation allows the IT environment management administrator to identify other IT administrators by adding the other IT administrators to a network of friends of the IT administrator, the network of friends facilitating collaboration among a plurality of IT administrators.

11. A non-transitory, computer-readable storage medium embodying computer program code, the computer program code comprising computer executable instructions configured for:
identifying a plurality of devices within the IT environment;
communicating between the plurality of devices and an IT environment management system, at least one of the plurality of devices communicating with the IT environment management system via a standard communication protocol, the standard communication protocol comprising at least one of a simple network management protocol (SNMP) communication protocol and a Syslog communication protocol, another of the plurality of devices communicating with the IT environment management system via a user datagram protocol type application;

providing event information from a device of the plurality of devices to an IT environment management system, the IT environment management system comprising a server type information handling system, the IT environment management system performing a social network management operation, the social network management operation providing the event information to an IT environment administrator via a social network analog;

managing the device of the plurality of devices via the social network engine, the social network engine providing the social network analog; and, identifying certain devices of the plurality of devices within the IT environment as friends in the social media analog; and wherein at least some of the plurality of devices provide information about themselves and neighbors to allow the IT environment management system to build a map of devices of interest, the information about neighbors being based on link layer discovery protocol (LLDP) information;

the IT environment management system generates events, the events are provided to an end point application of the IT environment administrator based upon a plurality of factors; and, the plurality of factors comprise whether the device is in a friend list of the end point application of the IT environment administrator, the friend list representing devices with which the user interacts, events from devices in the friend list being presented within a news feed of the social network analog, whether the event is in an interest list of the end point application of the IT environment administrator, the interest list representing an area of specialization of the IT environment administrator, a severity of the event, if the event has actuated by someone that is in the friends list of the end point application of the IT environment administrator, and when a event is explicitly shared by administrators that are on the friends list of the end point application of the IT environment administrator.

12. The non-transitory, computer-readable storage medium of claim 11, wherein the computer executable instructions are further configured for:

associating certain devices of the plurality of devices within the IT environment with an interest list of the IT environment administrator.

13. The non-transitory, computer-readable storage medium of claim 12, wherein:

the social network management operation causes events to appear on a news feed of the social network analog whenever an event occurs which affects a device which is associated with the interest list of the IT environment administrator.

14. The non-transitory, computer-readable storage medium of claim 12, wherein:

the social network management operation causes events to appear on a timeline of the social network analog whenever an event occurs which affects a device which is associated with the interest list.

15. The non-transitory, computer-readable storage medium of claim 11, wherein:

the social network management operation allows the IT environment management administrator to identify other IT administrators by adding the other IT administrators to a network of friends of the IT administrator, the network of friends facilitating collaboration among a plurality of IT administrators.

16. The method of claim 1, wherein:

events received by the end point application pop up as event notifications when received by the end point application.

17. The method of claim 1, wherein:

events received by the end point application are displayed on a timeline within the end point application; and, events are provided to the end point application in reverse chronological order to facilitate correlation in case of an outage.

* * * * *